3,766,301
PREPARATION OF POLYMERS OF INCREASED AVERAGE MOLECULAR WEIGHT FROM MONO-LITHIUM TERMINATED BLOCK COPOLYMERS COUPLED WITH CERTAIN ARYL MONOESTERS
Harold E. De La Mare, El Cerrito, and Charles H. Wilcoxen, Jr., San Lorenzo, Calif., assignors to Shell Oil Company, New York, N.Y.
No Drawing. Continuation-in-part of abandoned applications Ser. No. 751,368, Aug. 9, 1968, and Ser. No. 848,324, Aug. 7, 1969. This application May 21, 1971, Ser. No. 145,874
Int. Cl. C08f 19/06, 19/08
U.S. Cl. 260—879                     5 Claims

ABSTRACT OF THE DISCLOSURE

High coupling efficiency for the production of halogen-free coupled block copolymers is effected by the use as the coupling agent of aryl monoesters which are free from hydrogen substituents in the position alpha to the carboxyl group such as phenyl benzoate.

---

This application is a continuation-in-part of application Ser. No. 751,368, filed Aug. 9, 1968, now abandoned, and of co-pending application Ser. No. 848,324, filed Aug. 7, 1969 now abandoned.

BACKGROUND OF THE INVENTION

In recent years a wide variety of block copolymers have been studied. These are becoming of increasingly great commercial importance. One of the major difficulties in the production of block copolymers is the difficulty of a clean cross-over from one polymerizable monomer to the next polymerizable monomer when adding a different polymer block. This results either in polymer die-out at that point or in a product having a broad spectrum of molecular weight species, neither of which is a desired result. In order to achieve the desired set of physical properties, it is desirable to have complete control over the molecular weight of all of the polymer chains and blocks forming these chains. The most desirable way of achieving this is to utilize coupling agents. For example, when a block copolymer of polystyrene and butadiene is to be formed utilizing a lithium alkyl catalyst, the option exists of either using a process involving sequential addition of the two monomers or of employing a coupling step at one point in a sequential process. A typical process of the type falling within the area of the present invention comprises initially polymerizing styrene, utilizing a lithium alkyl initiator therefor, then injecting butadiene to form the second polymer block resulting in a living polymer associated with a lithium ion and having the configuration polystyrene-polybutadiene-Li. At this point a coupling agent is added to the reaction mixture which results in the coupling of two or more of these precursor block polymer molecules. Coupling agents of a number of different types may be employed for this purpose. The present invention is directed to the type of coupling agent which will produce a coupled product having the general configuration A–B–B–A, when the precursor block copolymer had the configuration A–B–Li.

One of the chief economic problems associated with the block polymerization of conjugated dienes with other co-polymerizable monomers when using a coupling reaction lies in the competitive reaction which occurs at the same time, namely, that of polymer termination. By this is meant the reaction which involves the replacement of the lithium ion with a single reactive group of one kind or another which either terminates the polymer chain at that point or at least does not permit coupling of chains having such reactive terminals. Thus if coupling agents are employed having the usual coupling "efficiency," the coupled products comprise a mixture of uncoupled species and coupled species. The significance of this undesirable state of affairs will be apparent from the consideration of the objectives in the preparation of block copolymers. A block copolymer having, for example, the structure polystyrene-polybutadiene-polystyrene can be adjusted in its molecular weight of the individual blocks to give a product having either elastomeric or thermoplastic properties. These are gained without vulcanizing or curing the product, although curing or vulcanizing may be employed if desired. However, it is only due to the peculiar structure of these block copolymers that such properties may be achieved without vulcanization. If a product having the structure polystyrene-polybutadiene is formed without a second vinyl arene polymer block on the other end of the polybutadiene block, the resulting product is low in tensile strength and if it is to be used, requires vulcanization or curing. When combined with the desired block polymer having the structure A–B–A, the non-coupled material or two-block material acts to dilute the beneficial properties of the A–B–A block copolymer. In other words, it performs nothing more than an extending oil function. However, it is readily understandable that this is not a desirable extending oil since it costs up to five times or more as much as a rubber extending oil such as naphthenic mineral oil. Thus, for most purposes, the use of coupling agents having less than maximum coupling efficiency produces a mixture of species which is deficient in the desired maximum set of physical properties and relatively expensive for the properties obtained.

There is an increasing interest in hydrogenated block copolymers wherein hydrogenation is either selective in reducing the aliphatic double bonds of a diene polymer block or complete wherein not only the diene double bonds are reduced but also the double bonds of any other species such as vinyl arene double bonds. However, in the desired hydrogenation process, care must be taken to exclude or minimize the presence of compounds or components which are known to be hydrogenation catalyst poisons. Common among such poisonous materials are halogens or halogen species. Heretofore, one of the most widely used coupling agents comprised haloalkanes or dihaloalkenes. These coupling agents, while efficient up to about 88% coupling, result in a product which is contaminated with halogen residues. If the product thereafter is subjected to hydrogenation, these halogen residues act as catalyst poisons and reduce the efficiency of the hydrogenation process or even prevent complete hydrogenation of the coupled product.

Attempts have been made in the past to achieve the coupling of block copolymers which are halogen-free by the use of a number of different types of coupling agents. However, careful investigation has shown that substantially all of these attempts have been less than satisfactory especially concerning the efficiency of the coupling reaction. For example, the Uraneck et al. patent, U.S. 3,135,716, is directed to the treatment of polymers prepared with polyfunctional lithium catalyst which result in the placement of a lithium ion on each end of the polymer chain. These polylithio polymers are then treated with a wide variety of reagents primarily for the purpose of placing on the terminals of the chain a number of reactive groups which in turn may be treated to form coupled products. In other words, for the most part this is a two-stage coupling process involving in effect an inefficient means for arriving at a coupled poduct if a suitable and highly efficient single stage coupling process is available. The only type of coupling agents referred to are either halogen-containing ones such as phosgene or other types of material which are not pertinent to the present invention. The patentees attempted to replace the lithium ions on each chain with a number of other reactive materials, treating the living polymer for this purpose with a wide variety of substances including ethyl acetate, methyl propionate, cyclohexyl butyrate, ethyl benzoate, phenyl acetate, tolyl propionate or butynyl acetate. There is no indication whatsoever that any of these would produce coupling or if coupling did, in fact, occur what the efficiency of the coupling reaction might be.

Another prior art patent is German 1,073,742 which shows a proposed process for stabilizing alpha methyl styrene living polymers by treatment with a wide variety of agents similar in their diverse scope and indefinite behavior to the disclosures of the Uraneck patent. Among many other types of agents, the German patentees employed ethyl acetate, phenyl acetate or butyl stearate, for the sole purpose of stabilizing lithium produced polymers of alpha methyl styrene. There is no attempt in this patent to obtain clearly defined coupled products nor was there any consideration given to diene polymers directly associated with a lithium radical. Consequently, the patent is lacking in an enabling teaching which would aid a research expert to arrive at the invention now to be described.

The prior art is replete with a wide variety of suggestions for the type of lithium species which may be employed as initiators in solution polymerization. These may be separated into monofunctional initiators such as lithium alkyls, on the one hand, and polyfunctional lithium compounds on the other of which dilithio stilbene is typical. Lithium alkyls may be employed for initiation of diene polymerizations at normal operating temperatures which do not involve refrigeration, an expensive step when conducted on a commercial scale. Dilithio initiators such as dilithio stilbene and the like have the commercial disadvantage relative to lithium alkyls in that they require substantially lower temperatures in the order of 0-75° C. if polymerization is to proceed satisfactorily. The two reactions differ in that the monofunctional lithium initiators result in growing polymer chains in which only one end of the chain is growing and directly associated with a lithium ion. The difunctional lithium catalyst, on the other hand, proceeds by polymer chain growth on both ends of the polymer chain resulting in a lithium polymer in which both ends of the polymer chain are directly associated with lithium radicals. The present invention contemplates the avoidance of these low temperature reactions by employing a lithium alkyl initiator; avoidance of halogen contamination by utilizing halogen-free coupling agents, and most importantly, utilizing a type of coupling agent which will result in extremely high coupling efficiency compared with other closely related compounds which are relatively poorer in coupling efficiencies.

STATEMENT OF THE INVENTION

Now, in accordance with the present invention a process is provided for the preparation of coupled block copolymers of conjugated dienes having essentially double the molecular weight of precursor block copolymers described hereinafter, the process comprising forming a precursor block copolymer by the use of a lithium alkyl initiator wherein at least one diene polymer block is directly associated with a single lithium ion; and thereafter contacting said living polymer at a temperature between about 20 and 100° C. with 0.5-10 moles per mole of lithium of a halogen-free monoester of an aromatic monocarboxylic acid and an aromatic monohydric alcohol, said ester having no hydrogens alpha to either side of the carboxyl group, whereby at least about 90% of the precursor polymer is dimerized.

The benefits of the present invention are three fold, namely, the combined use of a lithium alkyl initiator enabling polymerization at a reasonably high temperature in the order of 25-150° C.; the production of a coupled product which is free of halogen and is therefore suitable for subsequent hydrogenation without poisoning of the dimerized coupled products in a highly efficient operation resulting in a minimum amount of non-coupled diluent in the product.

The first stage of the process of the invention comprises the formation of a living precursor polymer having the general configuration A-B-Li, wherein A represents a copolymerizable monomer which may be a diene differing from the diene present in polymer block B, a vinyl arene such as styrene or alpha methyl styrene as well as ring alkylated styrenes, or copolymerizable polar monomers such as vinyl pyridines or the like. While the individual block molecular weights are not essential in the description of the present invention, in general, the blocks A are selected to have average molecular weights in the order of 2,000-100,000 while the block B (conjugated diene polymer block) have average molecular weights starting at about 20,000. The arrangement of the blocks A and B may vary but normally may be represented by a general configuration $(A-B)_n$ where $n$ is an integer between 1 and 8. When block polymers having the properties of a thermoplastic elastomer are contemplated, the blocks A comprise between 15 and 65% by weight of a precursor A-B-Li polymer. When block copolymers having the set set of physical properties associated with a thermoplastic polymer are desired, the block A usually will comprise between about 65 and 85 percent by weight of the precursor polymer. Molecular weights as referred to herein are determined by tritium counting methods which are directly correlated with intrinsic viscosity measurements.

The starting polymers are preferably prepared in an inert hydrocarbon medium such as an aromatic or naphthenic hydrocarbon, e.g., benzene or cyclohexane, which may be modified by the presence of an alkane or alkene such as pentanes or pentenes, the block copolymers being formed by the use of an organo monolithium initiator such as a lithium alkyl. Secondary butyl lithium is preferred for this purpose although other alkyl lithium catalysts may be used in which the alkyl radical has from 1 to 8 carbon atoms. The methods of making such block copolymers are known in the art and generally comprise the formation of a solution of the initiator to which is added the first monomer, namely, the monovinyl arene in such proportions that a polymer block of the desired average molecular weight is formed and then without terminating the polymer chain introducing the second monomer, namely, a conjugated diene to form the polymer block B. The process is characterized by the growing polymer chain bearing a lithium radical on one end. Thus, at the end of the polymerization and in its simplest form utilizing the preferred monomers, the starting block copolymer would have a configuration such as polystyrene-polybutadiene-lithium.

It is to be stressed that the monofunctional coupling agent must be injected into the system subsequent to he formaion of conjugaed diene polymers of desired intermediate molecular weight. If they are introduced during polymerization, it will be found that the product so obtained has molecular weights substantially lower than if they had been omitted from the polymerization system and much lower than if they were introduced only after polymerization has been completed to the desired degree.

Suitable and typical block copolymer species referred to herein as "precursor block copolymers" are the following:

polystyrene-polybutadiene-Li
polystyrene-polyisoprene-Li
polystyrene-(isoprene/butadiene)copolymer-Li
poly(alpha-methyl styrene)-polybutadiene-Li
(alpha methyl styrene/styrene)copolymer-polybutadiene-Li
polystyrene-(butadiene/styrene)copolymer-Li The aromatic monoesters utilized in the process of this invention as high efficiency coupling agents are preferably prepared from the following aromatic acids and aromatic alcohols.

| Aromatic alcohols | Aromatic acids |
|---|---|
| phenol | benzoic |
| α or β naphthols | naphthoic |
| o, m, p-biphenol | |
| o, m, p-cresols | o, m, p cresylic |

Typical species of aromatic monoesters having no hydrogens alpha to the carboxyl group and suitable especially for the high efficiency coupling of block copolymers in accordance with this invention are the following:

Aromatic monoesters:
  phenyl benzoate
  naphthyl benzoates
  biphenyl benzoates
  phenyl naphthoates
  biphenyl naphthoates
  phenyl toluate
  o, m, or p cresyl benzoates The reaction between the subject class of aromatic monoester and the starting block copolymers described above may be carried out in the same reaction medium in which the block copolymers bearing terminal lithium ions were prepared, or alternatively, the solution thus prepared may be added to another vessel containing a dispersion of the monoesters or other functional agents. Reaction is apparently essentially instantaneous but will depend in part upon the temperature, which is preferably between about 20 and 100° C., still more preferably 25–75° C. The reaction mixture usually is held only momentarily or for periods up to four hours. Preferred reaction periods are between 10 minutes and 1 hour. The process may be carried out in a batch manner or continuously. Following the reaction, the product is neutralized such as by the addition of water, alcohol or other reagents for the purpose of removing the lithium ions present. The product is then recovered such as by coagulation utilizing alcohol, acetone, or hot water and/or steam or both or spray drying to recover a polymer product having substantially increased average molecular weight, the predominant species present having an average molecular weight of at least 2 times that of the starting block copolymer.

The following examples illustrate a specific embodiment of the present invention and prove the comparative superiority of the use of a typical aromatic monoester as a coupling agent compared with other types of ester coupling agents.

EXAMPLE I

A precursor block copolymer was prepared in cyclohexane solvent utilizing butyl lithium as the initiator and first polymerizing styrene at 50° C. to form a first polystyrene block and thereafter injecting butadiene to form a butadiene block, the living block copolymer so formed then having the structure polystyrene-polybutadiene-lithium. It was determined that this precursor block copolymer had average molecular weights in the polystyrene block of about 14,000 and that the polybutadiene block had an average molecular weight of about 35,000. The precursor block copolymer was reacted for 1 hour at 60° with two equivalents of phenyl benzoate (1 mole) for each equivalent of lithium. Greater than about 96% of the intermediate polymer (polystyrene-polybutadiene-lithium) was coupled to form the desired end product, namely, polystyrene-polybutadiene- polystyrene. In order to determine the effect of residual two-block polymer and of oil in the completely coupled products, blends of these components were made as shown in Table I which follows. It will be seen that blend No. 1, comprising essentially 100% of the coupled product had an outstanding combination of physical properties and that any two-block polymer used to dilute this fully coupled product degraded the set of properties. It is noteworthy that the addition of oil could be tolerated to a large extent and still retain a set of physical properties similar to those obtained with the product usually obtained by the use of coupling agents of lower efficiency, namely, those that would be combinations of two- and three-block polymers as in blends 2 and 3.

Cements of the fully coupled product and of a blend resembling blend 2 were diluted with a rubber extending mineral oil and subjected to coagulation with steam to form a rubber crumb which was then subjected to drying in hot air. It was found that the fully coupled product could be diluted with more than 70 parts of oil per 100 parts of polymer and still dry as well as or better than the product of lower coupling efficiency when diluted with only 55 parts of oil.

TABLE I

| | Sample Number | | | | | | |
|---|---|---|---|---|---|---|---|
| | 1 | 2 | 3 | 4 | 5 | 6 | 7 |
| A. Composition (parts): | | | | | | | |
| 15S—64B—15S [1] | 100 | 100 | 100 | 100 | 100 | 100 | 100 |
| 14S—29B [2] | | 10 | 20 | 30 | | | |
| Oil | | | | | 10 | 20 | 30 |
| B. Physical properties: | | | | | | | |
| 100% modulus, $M_{100}$ (p.s.i.) | 388 | 310 | 274 | 277 | 308 | 228 | 271 |
| 300% modulus, $M_{300}$ (p.s.i.) | 459 | 413 | 375 | 363 | 407 | 324 | 347 |
| 500% modulus, $M_{500}$ (p.s.i.) | 780 | 650 | 539 | 520 | 662 | 505 | 500 |
| Tensile strength, $T_B$ (p.s.i.) | 5,840 | 5,620 | 5,054 | 4,583 | 5,333 | 4,583 | 4,025 |
| Extension at break $E_B$ (percent) | 819 | 910 | 1,103 | 1,391 | 906 | 1,000 | 1,300 |
| Hardness, Shore A | 70 | 67 | 65 | 63 | 59 | 56 | 50 |
| C. Melt flow: melt flow condition G (gm./10 min.) | 0.165 | 0.28 | 0.59 | 0.77 | 0.55 | 1.95 | 7.6 |

[1] Polystyrene-polybutadiene-polystyrene having block molecular weights of 15,000—64,000—15,000.
[2] Polystyrene-polybutadiene having block molecular weights of 14,000—29,000.

EXAMPLE II

The same precursor block copolymer was coupled by the use of other types of monoesters as shown in Table II below. Table II also shows the equivalent amount of the ester employed and the percentage of coupling which resulted. It will be noted that phenyl benzoate was the only coupling agent tested which had the desired high coupling efficiency. Thus the coupled products prepared by the use of the other monoesters contained varying but substantial amounts of the uncoupled precursor polymer. As shown by the comparative data given in the Example I, these products containing substantial amounts of precursor polymer will have physical properties less desirable than those of the phenyl benzoate coupled product.

TABLE II

| Coupling agent | Equiv. agent per, equiv. Li | Percent coupling |
|---|---|---|
| Ethyl acetate | 5.0 | 88 |
| Ethyl acrylate | 2.0 | 63 |
| Butyl methacrylate | 2.0 | 84 |
| Butyl butyrate | 2.0 | 85 |
| Methyl benzoate | 1.05 | 79 |
| Methyl acetate | 1.05 | 87 |
| Phenyl benzoate | 2.0 | 96 |
| Vinyl acetate | 2.0 | 80 |

We claim as our invention:

1. The process for the preparation of a coupled conjugated diene block copolymer which includes the steps:
   (a) polymerizing a conjugated diene in the presence of a lithium alkyl to form a living precursor polymer of the diene, each polymer chain of said diene polymer being directly associated with a single lithium ion;
   (b) and thereafter contacting said living polymer at 20 to 100° C. with 0.5–10 moles, per mole of lithium, of a halogen-free monoester of an aromatic monocarboxylic acid and an aromatic monohydride alcohol, said ester having no hydrogens alpha to either side of the

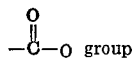

whereby at least about 90% of the precursor polymer is dimerized.

2. A process according to claim 1 wherein the living precursor polymer has the structure A-B-Li wherein A comprises a polymer block predominating in monovinyl arene units and B is a polymer block predominating in conjugated diene units.

3. A process according to claim 1 wherein the monoester is present in an amount between about 0.55 and 5 moles per mol of lithium ion.

4. A process according to claim 1 wherein the ester is phenyl benzoate.

5. A process according to claim 1 wherein the ester is a naphthyl benzoate.

References Cited

UNITED STATES PATENTS

| | | | |
|---|---|---|---|
| 3,135,716 | 6/1964 | Uraneck et al. | 260—45.5 |
| 3,177,190 | 4/1965 | Hsieh | 260—94.2 |

JOSEPH L. SCHOFER, Primary Examiner

W. F. HAMROCK, Assistant Examiner

U.S. Cl. X.R.

260—85.1, 94.7 R, 94.7 A, 880 R, 880 B